United States Patent [19]
Isquith et al.

[11] 3,730,701
[45] May 1, 1973

[54] METHOD FOR CONTROLLING THE GROWTH OF ALGAE IN AN AQUEOUS MEDIUM

[75] Inventors: Alan J. Isquith, Midland; Eugene A. Abbott; Patrick A. Walters, both of Freeland, all of Mich.

[73] Assignee: Dow Corning Corporation, Midland, Mich.

[22] Filed: May 14, 1971

[21] Appl. No.: 143,650

[52] U.S. Cl. .......................................... 71/67, 71/121
[51] Int. Cl. ................................................. A01n 9/00
[58] Field of Search ................... 71/67, 121; 162/161; 260/448.2

[56] References Cited

OTHER PUBLICATIONS

Stroganov et al., Chem. Abst., Vol. 70 (1969)

Primary Examiner—Lewis Gotts
Assistant Examiner—Catherine L. Mills
Attorney—Robert F. Fleming, Jr., Laurence R. Hobey, Harry D. Dingman, Howard W. Hermann and Joseph R. Radzius

[57] ABSTRACT

A method for controlling the growth of algae in an aqueous medium by adding to the medium an effective amount of certain silyl quaternary amines. For example, a silyl quaternary amine of the formula

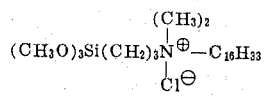

is added to the liquid medium in an amount ranging from 1.0 to 10,000 micrograms per ml. of the aqueous medium and after a period of from 2.0 to 24 hours, the algae are flocculated without rendering the aqueous medium toxic to humans, animals and fish.

8 Claims, No Drawings

METHOD FOR CONTROLLING THE GROWTH OF ALGAE IN AN AQUEOUS MEDIUM

This invention relates to a method for controlling the growth of algae in an aqueous medium.

It is well recognized that the accumulation of algae in aqueous mediums, e.g., water systems pose severe problems that demand constant attention. For example, in closed water systems such as cooling towers, algae will precipitate and accumulate over periods of time which results in a slimelike substance that necessarily clogs various mechanical components, e.g., valves and the like.

Conventional means for presently solving the problem may involve shutting the entire system down, draining the water, and scrubbing or otherwise physically cleaning the interior of the towers and eventually replenishing the tower with clean water. Such a method is obviously cumbersome, time consuming and must be done at too frequent intervals.

Alternatively, the water in the tower may be purged with chlorine gas which will destroy the algae; however, there is a limitation attendant with this particular method in that the water can be rendered toxic to fish, animals, and humans. Possible leaks or spills could pose a serious threat to the environment and great care must be taken in employing this method.

It an object of the instant invention to avoid the disadvantages inherent with the conventional methods noted heretofore.

In accordance with this invention, it has been found that certain silyl quaternary amine compounds can be added to the aqueous medium in extremely small amounts and the algae are flocculated in a relatively short period of time. The flocculated algae can then be rapidly removed from the liquid medium by simple and feasible means such as use of a filter, mere physical removal, etc. The silyl quaternary amines are effective in controlling growth of the algae at concentrations which are not harmful to animal life.

This invention is also useful in purifying stagnant water and streams and can also be used to clean ornamental ponds in a home environment in a rapid, simple and effective fashion.

These objects and others will become readily apparent from the detailed description which follows.

This invention relates to a method for controlling the growth of algae in an aqueous medium comprising adding to the aqueous medium in an amount of from 1.0 to 10,000 micrograms per ml. of said aqueous medium a silyl quaternary amine compound of the formula

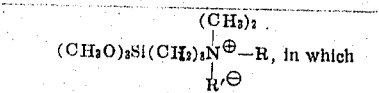

in which

R is an alkyl radical of from 11 to 22 carbon atoms,
R' is a halogen atom, whereby said algae are flocculated.

As noted above, R can be an alkyl radical of from 11 to 22 carbon atoms such as the $-C_{11}H_{23}$, $-C_{12}H_{25}$, $-C_{14}H_{29}$, $-C_{16}H_{33}$, $-C_{18}H_{37}$, and the $-C_{22}H_{43}$ radical. R' can be any halogen atom, i.e., the chlorine, bromine, iodine, or fluorine atom.

The silyl quaternary amine compounds are effective in amounts ranging from 1.0 micrograms to 10,000 micrograms per ml. of the aqueous medium and flocculation occurs in a period of time ranging from about 2.0 hours to about 24 hours. The most effective concentration which is effective at flocculating in short periods of time is in some cases dependent upon the specific structure of the R radical. That is, it has been found that when the R radical is $-C_{16}H_{33}$ only 1.0 microgram of the silyl quaternary amine is required to effectively flocculate the algae in 18 hours. In other cases it may require larger concentrations to flocculate in an 18 hour period. Generally speaking; however, when the concentration reaches 10,000 mg. per ml. of the aqueous medium, the algae are flocculated in a period of time not exceeding 2.0 hours.

When flocculation occurs, the algae precipitate and clump and fall to the bottom of the aqueous medium. It is believed that flocculation initiates an alteration of the physiological processes of the algae, i.e., loss of chlorophyll, eventually resulting in death.

The particular silyl quaternary amine compound may be added to the aqueous medium in an essentially neet or pure state or it may be added in a solvent system to enhance its solubility. Suitable solvents include alcohols such as methanol, ethanol, butanol, and the like; methyl cellusolve; ethyl cellusolve; ethers such as methyl ether, ethyl ether, and diethyl ether; and ketones such as methyl ethyl ketone.

The flocculated algae may or may not be removed from the aqueous medium. For example, if desired, one may physically remove the flocculated algae by standard means such as filtration or the like. Alternatively, one may allow the flocculated algae to precipitate to the bottom of the aqueous medium and thereafter siphon or collect the supernatent portion of the liquid medium which is now free from the algae.

The silyl quaternary amine compounds are effective for flocculating a broad spectrum of the algae kingdom. These would include the Cyanophyta (blue-green algae), the Chlorophyta (green algae), and the Chrysophyta (yellow-green algae), or mixed populations thereof.

The silyl quaternary amine compounds are well known materials which are prepared by known means. One would simply warm, in a suitable solvent and preferably at autogenous pressure, an appropriate tertiary amine, e.g., $C_{16}H_{33}N-(CH_3)_2$ with the appropriate silane, e.g., chloropropyltrimethoxy silane. Alkylation of the tertiary amine with the alkyl halide occurs and the silyl quaternary amine compound, e.g.,

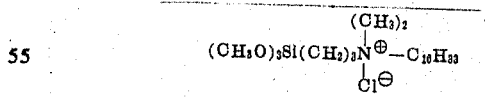

is readily obtained.

It should also be understood that in the above preparation, frequently the tertiary amine involved are mixtures of long-chain alkyl dimethyl amines which are derived from natural products such as hydrogenated tallow oil, coconut oil, fish oils, and the like. For example, if the tertiary amine is derived from fish oils, the resulting silyl quaternary amine compound would consist of a mixture in which the R group is $C_{20}H_{41}$ and also $C_{22}H_{43}$.

The following example is illustrative only and should not be construed as limiting the invention which is properly delineated in the appended claims.

EXAMPLE 1

Six test tubes were each filled with 9.0 mls. of algal solution containing approximately 3,500,000 cels per cubic cm. The algae consisted of a mixed population of Cyanophyta (blue-green algae), Chlorophyta (green algae), and Chrysophyta (yellow-green algae). The silyl quaternary amine compounds were added to the tubes to bring the final volume to 10 mls. The flocculation inducing compound was present in the test tubes in the following concentrations; Tube 1, 10,000 micrograms per ml.; Tube 2, 1,000 micrograms per ml.; Tube 3, 100 micrograms per ml.; Tube 4, 10 micrograms per ml.; Tube 5, 1.0 microgram per ml.; and Tube 6, no treatment control.

The compound and the algal suspensions were shaken on a vortex test tube shaker for 5.0 seconds and visual observations for the time required to flocculate the algae and settle to the bottom was noted at intervals of 2.0, 18, and 24 hours. The work was conducted under continuous illumination to insure normal algal growth and metabolism.

The table set forth below illustrates the results obtained:

| Compound | Time, hours | Final concentration (micrograms per ml.) | | | | | |
|---|---|---|---|---|---|---|---|
| | | 10,000 | 1,000 | 100 | 10 | 1.0 | Con. |
| $(CH_3O)_3Si(CH_2)_3\overset{(CH_3)_2}{\underset{Br^\ominus}{N^\oplus}}-C_{11}H_{23}$ | 2<br>18<br>24 | +<br>+<br>+ | 0<br>0<br>0 | 0<br>0<br>0 | 0<br>0<br>0 | 0<br>0<br>0 | 0<br>0<br>0 |
| $(CH_3O)_3Si(CH_2)_3\overset{(CH_3)_2}{\underset{Cl^\ominus}{N^\oplus}}-C_{12}H_{25}$ | 2<br>18<br>24 | +<br>+<br>+ | 0<br>+<br>+ | 0<br>0<br>0 | 0<br>0<br>0 | 0<br>0<br>0 | 0<br>0<br>0 |
| $(CH_3O)_3Si(CH_2)_3\overset{(CH_3)_2}{\underset{Cl^\ominus}{N^\oplus}}-C_{14}H_{29}$ | 2<br>18<br>24 | +<br>+<br>+ | 0<br>+<br>+ | 0<br>0<br>+ | 0<br>0<br>0 | 0<br>0<br>0 | 0<br>0<br>0 |
| $(CH_3O)_3Si(CH_2)_3\overset{(CH_3)_2}{\underset{Cl^\ominus}{N^\oplus}}-C_{16}H_{33}$ | 2<br>18<br>24 | +<br>+<br>+ | +<br>+<br>+ | 0<br>+<br>+ | 0<br>+<br>+ | 0<br>+<br>+ | 0<br>0<br>0 |
| $(CH_3O)_3Si(CH_2)_3\overset{(CH_3)_2}{\underset{Cl^\ominus}{N^\oplus}}-C_{18}H_{37}$ | 2<br>18<br>24 | +<br>+<br>+ | 0<br>+<br>+ | 0<br>+<br>+ | 0<br>+<br>+ | 0<br>0<br>0 | 0<br>0<br>0 |
| A mixture of:<br>$(CH_3O)_3Si(CH_2)_3\overset{(CH_3)_2}{\underset{Cl^\ominus}{N^\oplus}}-C_{20}H_{41}$<br>and<br>$(CH_3O)_3Si(CH_2)_3\overset{(CH_3)_2}{\underset{Cl^\ominus}{N^\oplus}}-C_{22}H_{43}$ | 2<br>18<br>24 | +<br>+<br>+ | 0<br>+<br>+ | 0<br>+<br>+ | 0<br>0<br>0 | 0<br>0<br>0 | 0<br>0<br>0 |

That which is claimed is:

1. A method for controlling the growth of algae in an aqueous medium comprising adding to the aqueous medium in an amount of from 1.0 to 10,000 micrograms per ml. of said aqueous medium, a silyl quaternary amine compound of the formula $$(CH_3O)_3Si(CH_2)_3\overset{(CH_3)_2}{\underset{R'^\ominus}{N^\oplus}}-R, \text{ in which}$$

R is an alkyl radical of from 11 to 22 carbon atoms, and

R' is bromine or chlorine, whereby said algae are flocculated.

2. The methods as recited in claim 1 which includes the further step of removing said flocculated algae.

3. The method as recited in claim 1 in which the R group is $-C_{16}H_{33}$, R' is a chlorine atom, and the silyl quaternary amine compound is added in an amount of 1.0 micrograms per ml. of the aqueous medium.

4. The method as recited in claim 1 in which the R group is $-C_{11}H_{23}$, the halogen atom is bromine, and the silyl quaternary amine compound is added in an amount of 10,000 micrograms per ml. of the aqueous medium.

5. The method as recited in claim 1 in which the R group is $-C_{12}H_{25}$, the halogen atom is chlorine, and the silyl quaternary amine compound is added in an amount of from 1,000 to 10,000 micrograms per ml. of the aqueous medium.

6. The method as recited in claim 1 in which the R group is $-C_{14}H_{29}$, the halogen atom is chlorine, and the silyl quaternary amine compound is added in an amount of from 100 to 10,000 micrograms per ml. of the aqueous medium.

7. The method as recited in claim 1 in which the R group is $-C_{18}H_{37}$, the halogen atom is chlorine, and the silyl quaternary amine compound is added in an amount of from 10 to 10,000 micrograms per ml. of the aqueous medium.

8. The method as recited in claim 1 in which the R group is a mixture of $-C_{20}H_{41}$ and $-C_{22}H_{43}$, the halogen atom is chlorine, and the silyl quaternary amine compound is added in an amount of from 100 to 10,000 micrograms per ml. of the aqueous medium.

* * * * *